(12) United States Patent
Ono et al.

(10) Patent No.: US 6,680,897 B2
(45) Date of Patent: Jan. 20, 2004

(54) OPTICAL DISK AND RECORDING/ REPRODUCTION APPARATUS USING THE SAME

(75) Inventors: Hiroaki Ono, Mito (JP); Shigemitsu Higuchi, Fujisawa (JP); Kenji Sano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 105 days.

(21) Appl. No.: 10/102,752

(22) Filed: Mar. 22, 2002

(65) Prior Publication Data

US 2002/0097664 A1 Jul. 25, 2002

Related U.S. Application Data

(63) Continuation of application No. 09/421,945, filed on Oct. 21, 1999, now Pat. No. 6,373,799.

(30) Foreign Application Priority Data

Oct. 22, 1998 (JP) ........................................... 10-300635

(51) Int. Cl.⁷ ................................................. G11B 5/84
(52) U.S. Cl. ...................................... 369/273; 369/291
(58) Field of Search ................................. 369/272, 273, 369/291, 52.1, 100; 360/133, 132

(56) References Cited

U.S. PATENT DOCUMENTS

| | | | |
|---|---|---|---|
| 4,745,294 A | 5/1988 | Kohashi et al. | |
| 5,119,353 A | 6/1992 | Asakura | |
| 5,235,586 A | 8/1993 | Feamster et al. | |
| 5,465,381 A | 11/1995 | Schmidt et al. | |
| 5,760,861 A | 6/1998 | Kim | |
| 5,862,117 A | 1/1999 | Feuntes et al. | ......................... 369/273 |
| 5,940,363 A | * 8/1999 | Ro et al. | ..................... 369/273 |
| 6,044,046 A | * 3/2000 | Diezmann et al. | .......... 369/273 |

FOREIGN PATENT DOCUMENTS

| | | |
|---|---|---|
| EP | 0 884 729 A2 | 12/1998 |
| FR | 2 762 429 | 10/1998 |
| JP | 59-87604 | 5/1984 |
| JP | 7-334637 | 12/1995 |
| WO | WO 97/41557 | 11/1997 |
| WO | WO 97/41562 | 11/1997 |
| WO | WO 98/52191 | 11/1998 |
| WO | WP 99/38162 | 7/1999 |

* cited by examiner

*Primary Examiner*—Allen Cao
(74) *Attorney, Agent, or Firm*—Antonelli, Terry, Stout & Kraus, LLP

(57) ABSTRACT

A recording disk having a recording medium and a memory assembly which is disposed in an annular or spiral form at a certain position on the disk. The memory assembly which a memory which stores information, a signal processor which writes or reads out information to/from the memory, a transmitter-receiver for transacting information with an exterior of the disk, a controller which controls the memory, signal processor and transmitter-receiver, a receiver which receives power in the form of a signal supplied from an exterior of the disk for the operation of the memory, signal processor, transmitter-receiver and controller, and a rectifier converts the signal received by the receiver into power. The memory, signal processor, controller, rectifier, and transmitter-receiver and/or receiver are at least partially formed of a semiconductor integrated circuit and at least portions of the memory, signal processor and controller are covered with light-blocking resin.

6 Claims, 13 Drawing Sheets

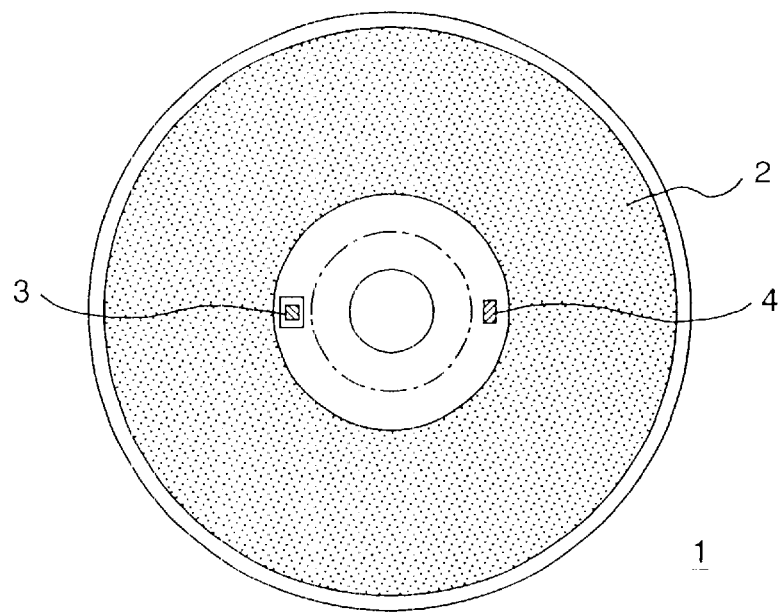
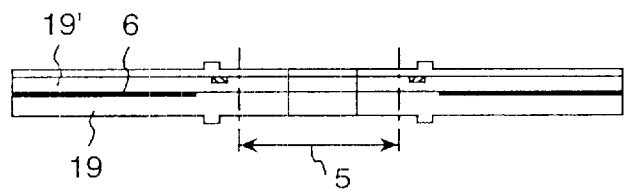
FIG. 6A
FIG. 6B
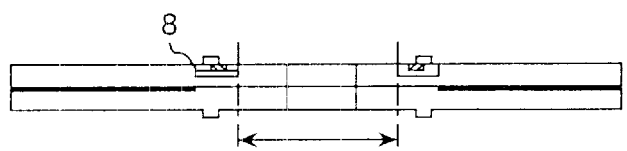
FIG. 6C
FIG. 6D

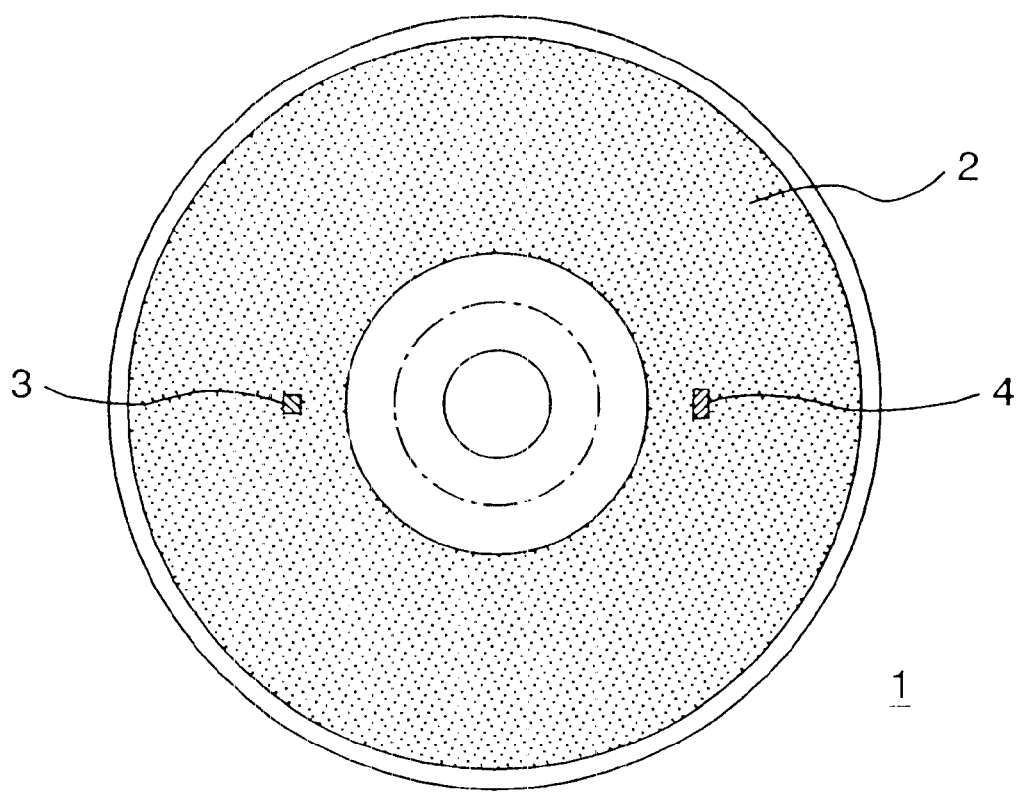

OPTICAL DISK AND RECORDING/REPRODUCTION APPARATUS USING THE SAME

CROSS REFERENCE TO RELATED APPLICATION

This is a continuation of U.S. application Ser. No. 09/421,945, filed Oct. 21, 1999, U.S. Pat. No. 6,373,799 the subject matter of which is incorporated by reference herein.

BACKGROUND OF THE INVENTION

The present invention relates to an optical disk and a recording/reproduction apparatus which uses this optical disk. Particularly, the invention relates to the structure of an optical disk having in its partial area a memory provided separately from the recording medium of the disk, and to a recording/reproduction apparatus which uses this optical disk.

A variety of electronic systems using recording mediums of optical disks which are easy for large-scale production and reliable in operation have been developed and put on the market recently. These optical disks are represented, for example, by the compact disk (CD) used for storing music, the digital video disk (DVD) used for storing pictures inclusive of the movies, and the CD-ROM and DVD-ROM used for storing computer application programs, game programs and various information.

Optical disks for the CD, CD-ROM and DVD-ROM are made of plastics, which enables the low-cost large-scale production of disks, with information being pre-recorded thereon. These reproduction-only disks, however, do not allow the additional data recording, and therefore it is not possible to record the result of process of data which has been read out of the disk or record the number of times of reproducing operation of the disk, for example. Therefore, it is unstable to be used for a information management system or the like with the capability of storing the results of games, restricting the access to computer application programs or limiting the number of times of playback of audio/video records.

Although there is known an optical disk which allows the additional data recording, it is expensive due to the complex fabricating process and does not enable the low-cost large-scale production. Moreover, it is necessary to pre-record the main information on each disk individually, and record additional data with a high-power optical recording head, resulting in an expensive recording/reproduction apparatus as compared with the simple reproduction apparatus.

There is known a scheme of recording control information on a medium which is provided separately from the medium of the main information. Specifically, a magnetic tape cartridge has the attachment of a semiconductor memory used for the management of the main information on the magnetic tape. The semiconductor memory is accessed for data input/output in a direct contact manner. Although this scheme may be applied also to the optical disk, it imposes the difficulty of data transmission to/from the semiconductor memory which is turning together with the disk.

SUMMARY OF THE INVENTION

An object of the present invention is to provide a reproduction-only optical disk which is intended for the CD, CD-ROM, DVD-ROM, etc., made of plastics for the low-cost, large-scale and high-yield manufacturing and pre-recording, and provided in its partial area with a memory which writes and reads out simply and reliably additional control information for the management of the main information on the disk so that the disk is useful for a information management system or the like which offers game programs, computer application programs or audio/video records with the capability of storing the results of games, restricting the access to computer application programs or limiting the number of times of playback of audio/video records, for example, and also to provide an inexpensive recording/reproduction apparatus which uses this optical disk.

In order to achieve the above objective, the inventive optical disk and recording/reproduction apparatus includes inside the disk a memory, which is built in the form of a semiconductor IC chip for example, used for the management of the main information of a game program, computer application program or audio/video record, in addition to the recording medium which stores the main information.

The memory incorporates a signal processor for transforming the control information into recording data for storing, a memory for storing the control information, and a controller for controlling the writing and read-out of the memory and treating the main information based on the analysis of control information, e.g., the number of times of reproduction of the main information or the restriction of reproduction of the main information.

For receiving power in the form of a signal to be supplied to the circuitries of semiconductor IC chip, an electromagnetic coupling means, i.e., a receiver means, such as an antenna is built in or disposed beside the IC chip. Alternatively, it is disposed in an annular or one or multi-turn spiral form on the disk.

The IC chip further incorporates a rectifier for converting the signal received by the receiver means into power. Similarly, for the communication of control information between the optical disk and the recording/reproduction apparatus, another electromagnetic coupling means, i.e., a transmitter-receiver means, such as an antenna is built in or disposed beside the IC chip. Alternatively, it is disposed in an annular or one or multi-turn spiral form on the disk.

The signals sent to the electromagnetic coupling means for control information transfer and power supply have their transmission band set outside of the main information recording band or the reproduction band in the case of the multiple-speed playback of the main information so that the signals do not affect the recording and reproduction of the main information. Accordingly, one of the following two kinds of means are required depending on the band of the signals transmitted to the electromagnetic coupling means for control information transfer and power supply.

(1) In the case of setting a lower transmission band, it is necessary for the electromagnetic coupling means to have a larger inductance in order to raise the coupling coefficient (transmission efficiency) for coping with the lower frequency. For the achievement of this inductance, at least the electromagnetic coupling means for control information transfer and power supply among the devices associated with the memory are located at positions outer than the outer bound of the recording medium on the disk, and they are disposed in an annular or one or multi-turn spiral form on the disk. For ensuring a large inductance of the electromagnetic coupling means, they are each formed of a conductor coil and a soft magnetic core. However, this arrangement is disadvantageous in regard to the recording capacity of the disk due to the disposition of the memory in the disk outer section which could provide a large recording area.

(2) In the case of setting a higher transmission band, it is possible for the electromagnetic coupling means to have a sufficiently large coupling coefficient (transmission efficiency) without the need of a large inductance in dealing with the higher frequency. It is even desirable to lower the electromagnetic coupling in order to minimize the influence of stray capacitance. In this case, the memory has its shape and location determined with respect to the following affairs.

(2-1) The memory is provided by being built therein or disposed thereby with electromagnetic coupling means. At least the electromagnetic coupling means for control information transfer and power supply among the devices associated with the memory are located at positions within the range of radius on the disk where the recording medium is formed and on the side of the disk opposite to the side on which recording and reproduction take place between the recording medium and the disk medium record/reproduce circuit of the recording/reproduction apparatus.

Based on this arrangement, the recording medium which is generally formed of a metallic film works as a reflector for the electromagnetic coupling means, which thus transmit the signals efficiently. This arrangement is applicable obviously only to the case where, at least, the main information is recorded and reproduced only on one side of the disk.

(2-2) At least the electromagnetic coupling means for control information transfer and power supply among the devices associated with the memory are located at positions inner than the inner bound of the recording medium on the disk, and they are built in or disposed beside the memory. Alternatively, the electromagnetic coupling means are disposed in an annular or one-turn spiral form at positions inner than the inner bound of the recording area of the recording medium on the disk. This arrangement is effective for the case where the disk has a multi-layer recording medium and recording and reproduction of the main information take place on both sides of the disk, for example. This arrangement is advantageous in regard to the recording capacity of the disk due to the disposition of the memory in the disk inner section which could provide a smaller recording area.

In case the transmitted signal for power supply and the transmitted signal for control information transfer do not interfere with each other, these signals are mixed, and the receiver for power supply and the transmitter-receiver for control information transfer as the electromagnetic coupling means are integrated to be a common device, which treats the mixed signal.

In the case of the inner disposition of the memory on the disk, while the disk is mounted on a disc-shaped turntable for high-speed recording and reproduction, the electromagnetic coupling means for control information transfer and power supply among the devices associated with the memory are located at least partially at positions outer than the clamping area of the disk on the turntable or outer than the mounting face of the turntable so that the transmitter-receiver and receiver as the electromagnetic coupling means are not precluded for their signal transaction by the turntable.

For balancing with the additional weight of the memory attached to the disk, a counterweight is put to the disk at the symmetrical position against the position of memory with respect to the center of rotation.

With the disk being mounted on the turntable of the recording/reproduction apparatus for high-speed recording and reproduction, the transmitter-receiver of the recording/reproduction apparatus for control information transaction with the memory on the disk and the transmitter for power supply to the memory are located at positions with distances virtually equal to the distances from the disk rotation center to the transmitter-receiver of the memory for data transaction and to the receiver for non-contact power supply from the outside, respectively.

In this case, the transmitter-receiver of the recording/reproduction apparatus for control information transaction with the memory on the disk and the transmitter for power supply to the memory have their shapes and locations determined with respect to the following affairs.

(1) In case the transmitter-receiver and receiver as the electromagnetic coupling means attached to the disk are disposed in an arcuate, annular or spiral form, the transmitter-receiver and transmitter as the electromagnetic coupling means of the recording/reproduction apparatus are disposed also in an arcuate, annular or spiral form on virtually concentric circles, or these devices are built in the form of a transmitter-receiver module disposed at a position which is away from the disk rotation center. The transmitter-receiver module has an integrated circuit arrangement inclusive of the transmitter-receiver and transmitter as the electromagnetic coupling means of the recording/reproduction apparatus and the associated driving circuitries.

(2) In case the transmitter-receiver and receiver as the electromagnetic coupling means on the disk are built in or disposed beside the IC chip, the transmitter-receiver and transmitter as the electromagnetic coupling means of the recording/reproduction apparatus are disposed in an arcuate, annular or spiral form on virtually concentric circles. Alternatively, the transmitter for supplying power to the memory is built in the form of a transmitter-receiver module and disposed at a position which is virtually on the center axis of the turntable.

The optical disk is generally formed of two pieces of plastic sheets stuck together, and the IC chip for the memory, with the electromagnetic coupling means being attached thereto, is disposed in regard to the disk thickness direction based on the following schemes.

(1) The IC chip for the memory and the electromagnetic coupling means are formed based on the insert-lamination scheme in the plastic sheet that is different from the plastic sheet for the formation of the recording medium. The plastic sheet, with the memory being insert-laminated, will have an offset by the thickness of the IC chip and electromagnetic coupling means, and therefore it is unstable for the formation of a recording medium on it.

(2) A recessed section is formed in one plastic sheet on its sticking side, the IC chip and electromagnetic coupling means are put in the recessed section, and both sheets are stuck. The IC chip and electromagnetic coupling means are concealed within the thickness of the stuck plastic sheets, and the disk surface does not swell. Moreover, another recording medium can be formed on the plastic sheet having the IC chip in the recessed section.

(3) The IC chip and electromagnetic coupling means are put in a recessed section which is formed on the side of plastic sheet opposite to the sticking side, and these members are glued with resin. This scheme enables the attachment of IC chips after optical disks have been completed, allowing the disk manufacturer to produce optical disks in the conventional manner and the distributer to put IC chips on afterward thereby to finish optical disks with the management function.

The IC chip can possibly fail in operation when it is exposed to a strong light, and therefore it is covered with light-blocking resin against the laser beam or the like used by the optical head.

The controller built in the IC chip is designed, for example, to focus the optical head of the recording/ reproduction apparatus to a certain position so that it operates on the tracking control actuator to alter the electrical offset value of the focus system, for example, independently of the recording/reproduction apparatus. In consequence, it becomes possible in the future, when multi-layer optical disks having various recording capacities will be put on the market, for the memory on the disk to deal with the number of recording layers and recording positions across the layers thereby to control independently the focal position of the optical head for the reproduction of records, for example.

BRIEF DESCRIPTION OF THE DRAWINGS

FIG. 6 is a set of diagrams of still another embodiment of this invention, showing the structure of an optical disk;

FIG. 7 is a diagram of still another embodiment of this invention, showing the structure of an optical disk;

DESCRIPTION OF THE PREFERRED EMBODIMENTS

The optical disk and recording/reproduction apparatus based on this invention include inside the disk a memory, which is built in the form of a semiconductor IC chip for example, used for the management of the main information, in addition to the recording medium which stores the main information.

Figure 1:
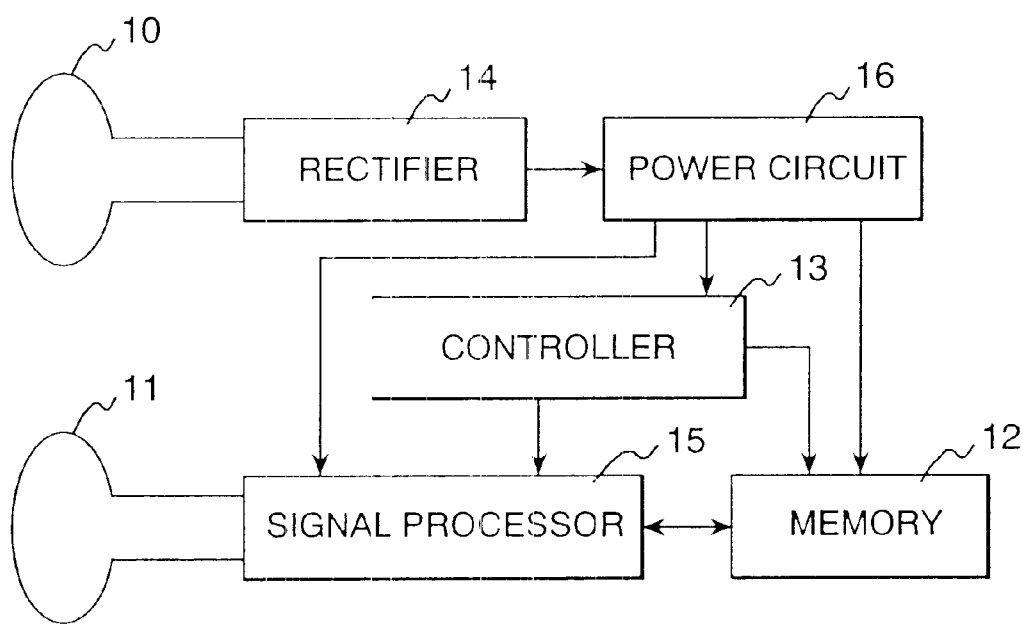
FIG. 1 is a block diagram of an embodiment of this invention, showing the arrangement of a memory which is disposed on an optical disk.
Figure 2:
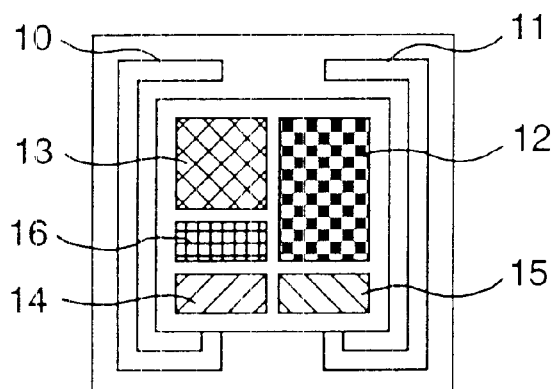
FIG. 2 is a diagram of an embodiment of this invention, showing the structure of an IC chip which is disposed on an optical disk.

FIG. 1 shows the arrangement of the inventive memory, and FIG. 2 shows the structure of the IC chip disposed on the optical disk.

The arrangement and structure of the inventive IC chip for the memory will be explained with reference to FIG. 1 and FIG. 2.

The memory 3 incorporates a signal processor 15 for transforming the control information into recording data for storing, a memory 12 for storing the control information, and a controller 13 for controlling the writing and read-out of the memory and treating the main information based on the analysis of control information, e.g., the number of times of reproduction of the main information or the restriction of reproduction of the main information.

For receiving power in the form of a signal to be supplied to the circuitries of semiconductor IC chip, an electromagnetic coupling means, i.e., a receiver means 10, such as an antenna is built in it. The IC chip further incorporates a rectifier 14 for converting the signal received by the receiver means into power. For the communication of control information between the optical disk and the recording/reproduction apparatus, another electromagnetic coupling means, i.e., a transmitter-receiver means 11, such as an antenna is built in the IC chip. The formation of these devices in a single IC chip enables the cost reduction of the memory.

Figure 3:
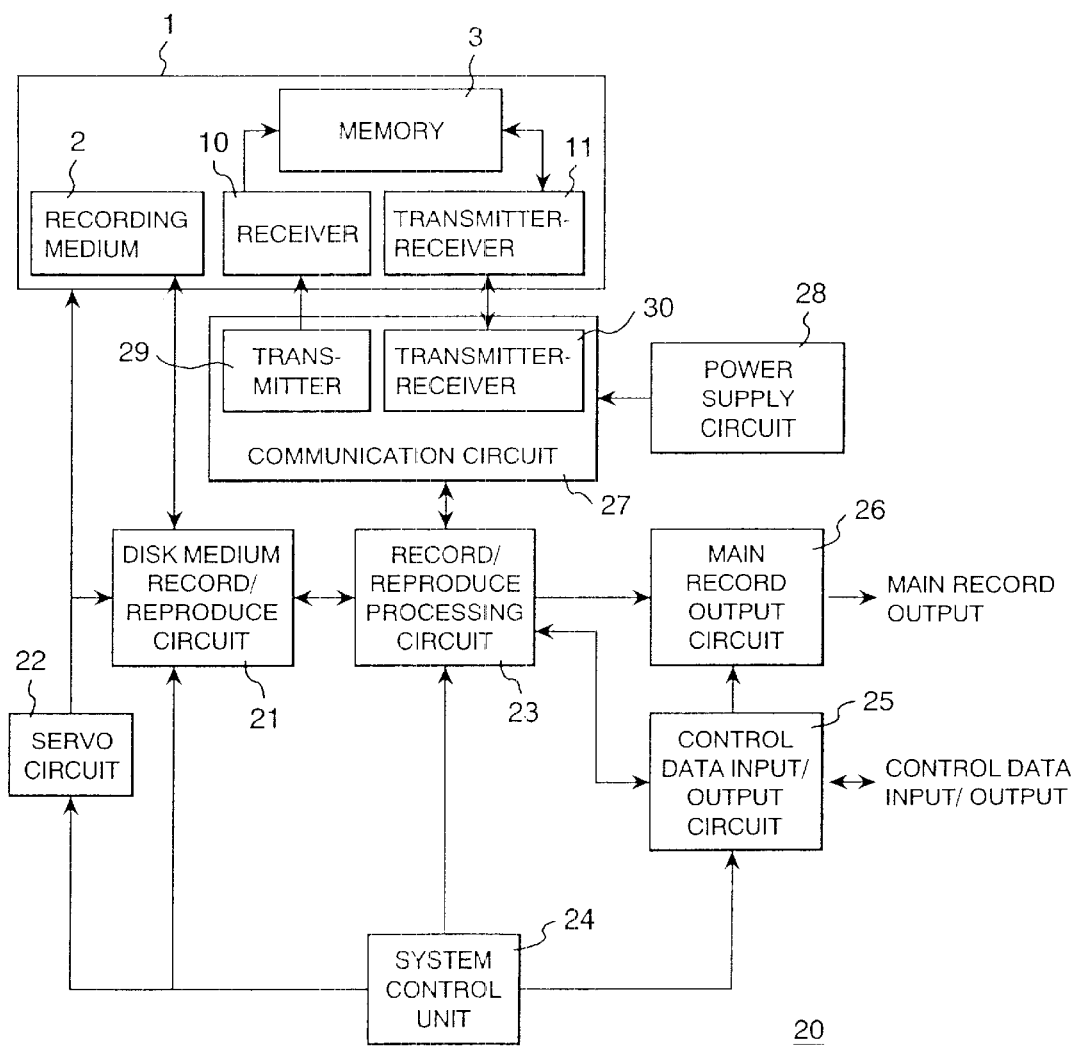
FIG. 3 is a block diagram of an embodiment of this invention, showing the arrangement of a recording/reproduction apparatus.

FIG. 3 shows the arrangement of the inventive recording/reproduction apparatus. Indicated by 1 is a disk, 2 is a recording medium, and 3 is a memory. The recording/reproduction apparatus 20 further includes as major components a disk medium record/reproduce circuit 21, a servo circuit 22, a record/reproduce processing circuit 23, a system control unit 24, a control data input/output circuit 25, a main record output circuit 26, a communication circuit 27, and a power supply circuit 28.

The functional blocks shown in FIG. 3 will be explained. The recording medium 2 which is formed on the disk 1 stores the main information of, for example, a computer application program, game program or audio/video record. The memory 3 which is formed as a semiconductor IC chip stores control information used for the management of the main information. The disk medium record/reproduce circuit 21 implements independently the recording and/or reproduction of the main information on the recording medium 2, and it is an optical head for the recording medium 2 of the optical disk.

The record/reproduce processing circuit 23 implements, for the reproduction of the main information for example, the expansion, decoding of error correction code and demodulation for the reproduced record provided by the disk medium record/reproduce circuit 21, and sends the processed signal to the main record output circuit 26. It also implements the compression, addition of error correction code and modulation for the control information which is transferred from the control data input/output circuit 25 to the memory 3 by being amplified by the communication circuit 27.

The memory 3 formed of an IC chip needs power, which is supplied from the power supply circuit 28 to the memory 3 by way of the communication circuit 27. The servo circuit 22 which includes a spindle motor, actuator and associated mechanisms performs the stable recording and reproducing operations for the disc-shaped recording medium 2.

The signals sent to the communication circuit 27 for control information transfer and power supply have their transmission band set outside of the main information recording band or the reproduction band in the case of the multiple-speed reproduction of the main information so that the signals do not affect the recording and reproduction of the main information. Accordingly, the following two kinds of means are required depending on the band of signals transmitted to the electromagnetic coupling means for control information transfer and power supply. A specific example of the main information signal having a recording bandwidth from 100 kHz to 30 MHz will be explained with reference to FIG. 4 and FIG. 5.

(1) In the case of setting a lower transmission band, as will be explained in connection with FIG. 4, it is necessary for the electromagnetic coupling means to have a larger inductance in order to raise its coupling coefficient (transmission efficiency) for coping with the lower frequency. For example, for the transmission at a frequency as low as 20 kHz, an inductance of the order of several mH is required.

Figure 4A:
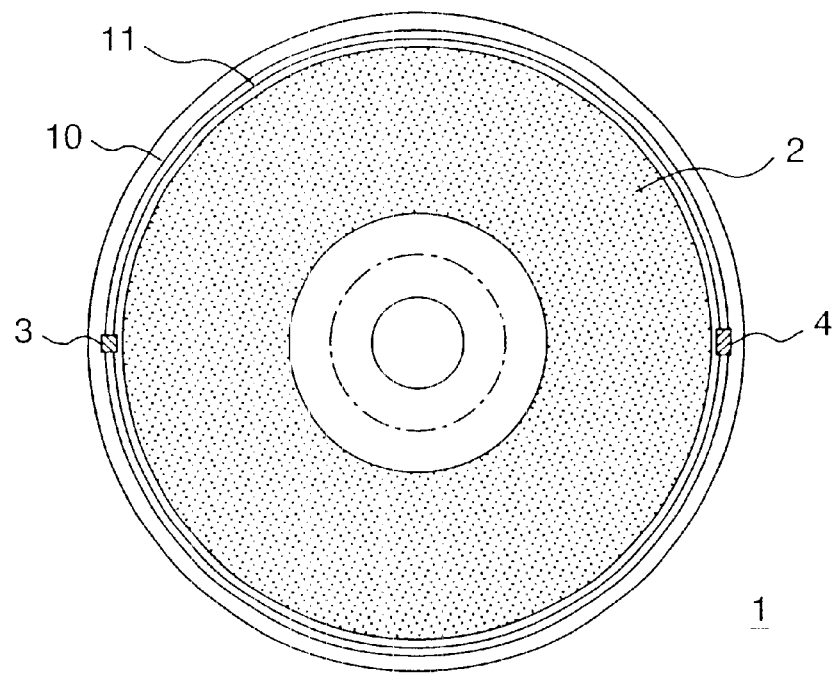
FIGS. 4A and 4B are diagrams of an embodiment of this invention, showing the structure of an optical disk.
Figure 4B:
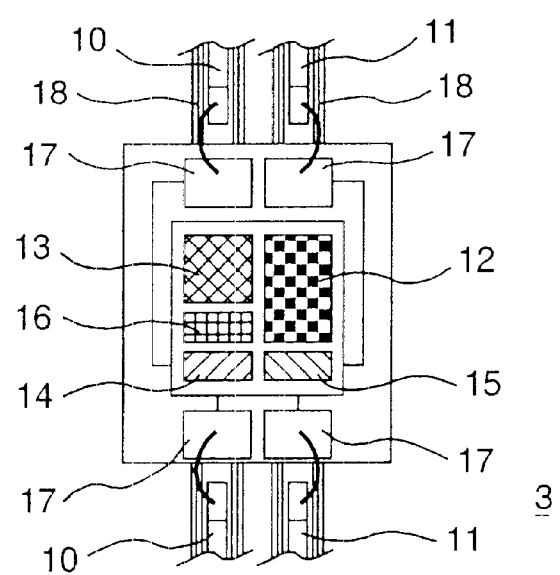
Figure 5A:
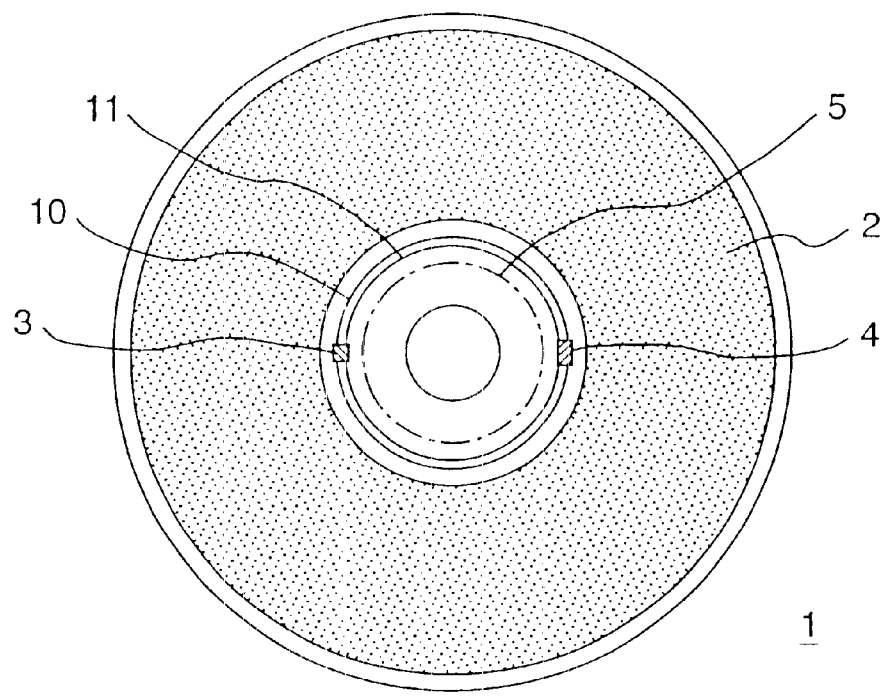
FIGS. 5A and 5B are diagrams of another embodiment of this invention, showing the structure of an optical disk.
Figure 5B:
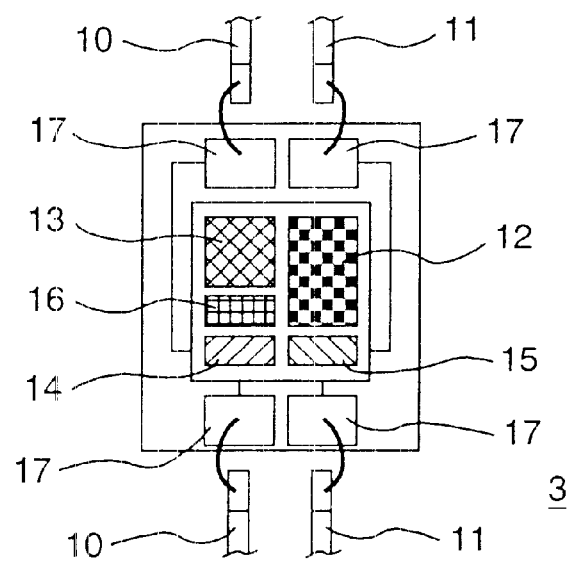

For the achievement of this inductance, it is not sufficient to build the electromagnetic coupling means in the IC chip, and therefore the memory 3 is located at a position outer than the outer bound of the recording medium on the disk, and the receiver 10 and transmitter-receiver 11 as the electromagnetic coupling means are disposed in an annular or one or multi-turn spiral form, as shown in FIG. 4. For ensuring a large inductance, the receiver 10 and transmitter-receiver 11 as the electromagnetic coupling means are each formed of a conductor coil and a magnetic core 18. The IC chip is connected to the receiver 10 and transmitter-receiver 11 as the electromagnetic coupling means through wires based on the formation of wire-bonding pads 17 on the IC chip.

The disposition of the memory 3 in the disk outer section is disadvantageous in regard to the recording capacity of the disk due to the absence of recording medium in this section which could provide a large recording area. The low-frequency transmission, however, enables high-power transmission, and therefore it is advantageous in case the memory 3 needs a large drive current.

(2) In the case of setting a higher transmission band, as will be explained in connection with FIG. 2, FIG. 5 and FIGS. 7–9, it is possible for the electromagnetic coupling means to have a sufficiently large coupling coefficient (transmission efficiency) in dealing with the higher frequency. In the case of the main information signal having a recording bandwidth not more than 30 MHz, with a band separation by 1.5 times the bandwidth, i.e., 45 MHz, with the intention of noise reduction, the inductance in need is as small as of the order of several $\mu$H. It is even desirable to lower the electromagnetic coupling of the receiver 10 and transmitter-receiver 11 in order to minimize the influence of stray capacitance. Accordingly, the receiver 10 and transmitter-receiver 11 as the electromagnetic coupling means of the memory 3 are to be built in or disposed beside the IC chip. Alternatively, these devices are disposed in an annular or one-turn spiral form on the disk.

In this case, the memory 3 is formed and disposed on the disk 1 with respect to the following affairs.

(2-1) The electromagnetic coupling means are built in or disposed beside the memory as shown in FIG. 2. The memory 3 is located at a position within the range of radius on the disk where the recording medium 2 is formed as shown in FIG. 7 and on the side of the disk opposite to the side on which recording and reproduction take place between the recording medium 2 and the disk medium record/reproduce circuit 21 of the recording/reproduction apparatus as shown in FIG. 8D and FIG. 9C.

Figure 8A:
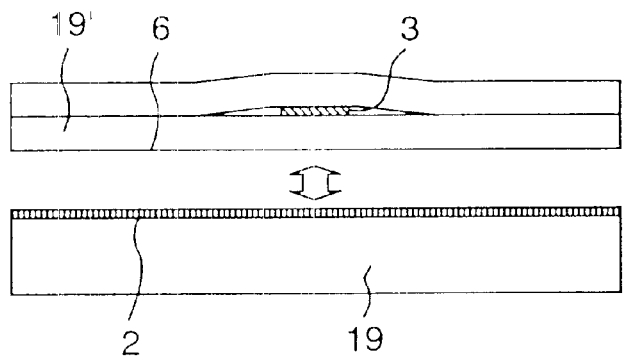
FIGS. 8A–8D are diagrams of still another embodiment of this invention, showing the structure of an optical disk.
Figure 8B:
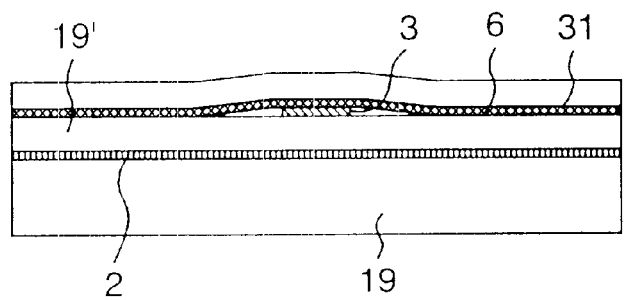
Figure 8C:
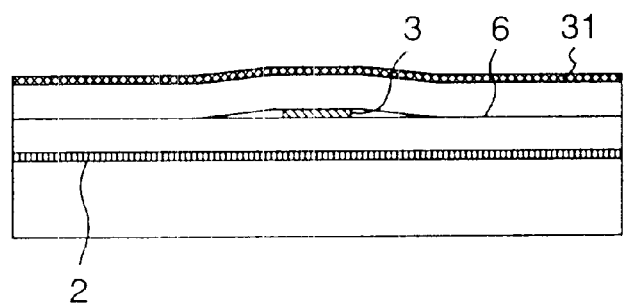
Figure 8D:
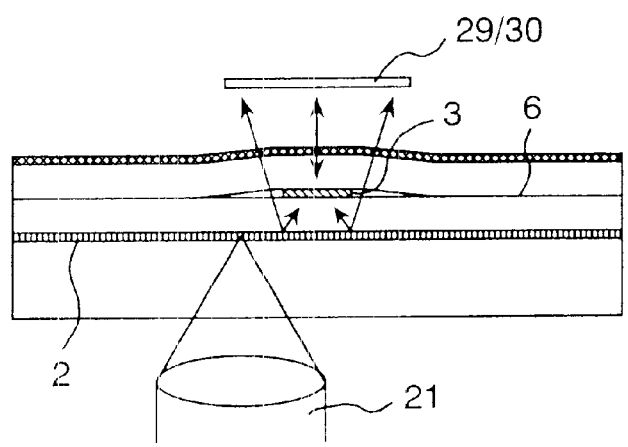

Based on this arrangement, the recording medium which is generally formed of a metallic film (specifically, an aluminum film is used for the reproduction-only medium of such as the CD-ROM and DVD-ROM) works as a reflector for the electromagnetic coupling means, as shown in FIG. 8D, which thus transmit the signals efficiently. Moreover, the metallic film is expected to have a shielding effect for the transmission of electromagnetic wave. This arrangement is applicable obviously only to the case where, at least, the main information is recorded and reproduced only on one side of the disk.

(2-2) The memory 3 is located at a position inner than the inner bound of the recording medium 2 on the disk, and the electromagnetic coupling means are built in or disposed beside the memory 3. Alternatively, the electromagnetic coupling means are disposed in an annular or one-turn spiral form at positions inner than the inner bound of the recording area of the recording medium 2 on the disk. This arrangement is effective for the case where the disk has a multi-layer recording medium and recording and reproduction of the main information take place on both sides of the disk, for example, as shown in FIG. 9D.

This arrangement is advantageous in regard to the recording capacity of the disk due to the disposition of the memory 3 in the disk inner section which could provide a smaller recording area which is less influential on the total recording capacity.

In case the transmitted signal for power supply and the transmitted signal for control information transfer do not interfere with each other, these signals are mixed, and the receiver 10 for power supply and the transmitter-receiver 11 for control information transfer as the electromagnetic coupling means are integrated to be a common device, which treats the mixed signal. This arrangement enables the cost reduction.

In the case of the inner disposition of the memory on the disk, while the disk is mounted on a disc-shaped turntable for high-speed recording and reproduction, the electromagnetic coupling means for control information transfer and power supply among the devices associated with the memory are located at least partially at positions outer than the contact face 5 of the disk to the turntable so that the transmitter-receiver and receiver as the electromagnetic coupling means are not precluded for their signal transaction by the turntable. Specifically, for example, these devices are located preferably in the disk section between the clamping area with a diameter of 22–33 mm and the burst cutting area (BCA) with a diameter of 44.6–47.0 mm which are the standard of the DVD and the like.

For balancing with the additional weight of the memory 3 attached to the disk 1, a counterweight 4 is put on the disk at the symmetrical position against the position of memory with respect to the center of rotation.

With the disk being mounted on the turntable 32 of the recording/reproduction apparatus 20 for high-speed recording and reproduction, the transmitter-receiver 30 of the recording/reproduction apparatus 20 for control information transaction with the memory 3 on the disk 1 and the transmitter 29 for power supply to the memory are located at positions with distances virtually equal to the distances from the disk rotation center to the transmitter-receiver 11 of the memory 3 for data transaction and to the receiver 10 for non-contact power supply from the outside, respectively.

In this case, the transmitter-receiver 30 of the recording/reproduction apparatus 20 for control information transaction with the memory on the disk and the transmitter 29 for power supply to the memory have their shapes and locations determined with respect to the following affairs as will be explained in contact with FIG. 10, FIG. 11 and FIG. 13.

Figure 10:
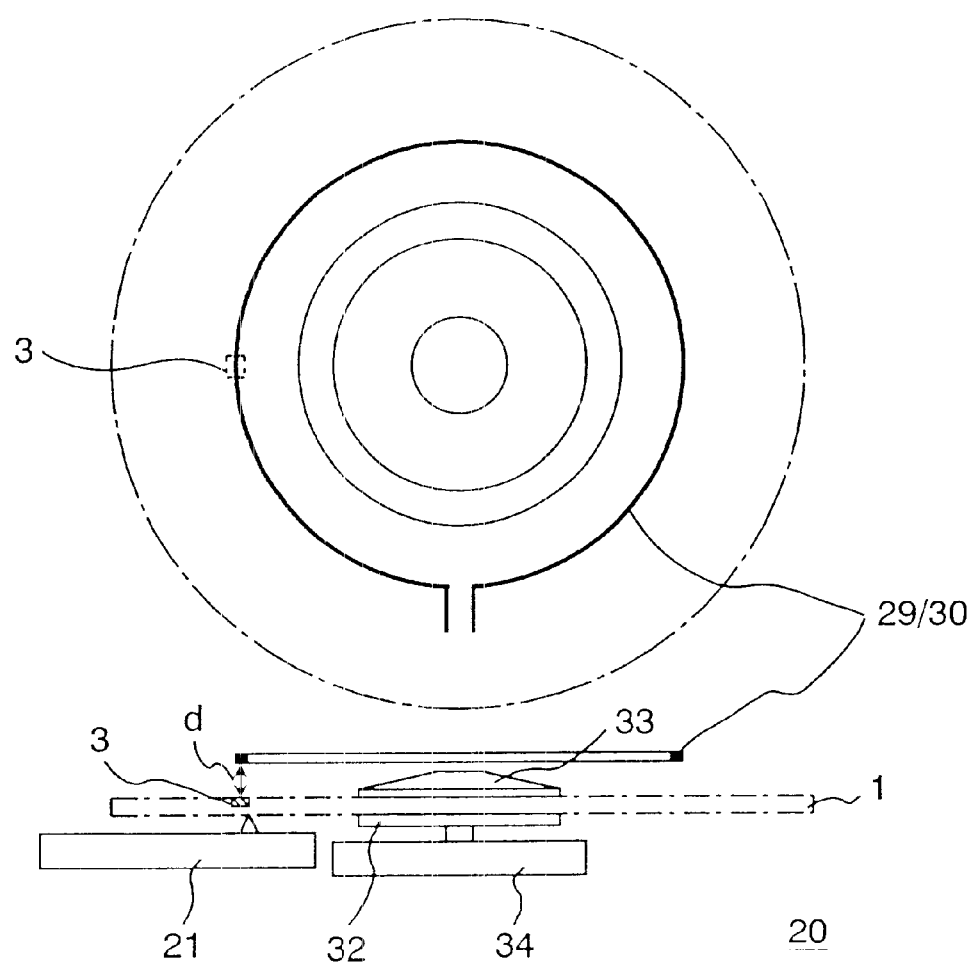
FIG. 10 is a diagram of an embodiment of this invention, showing in brief a recording/reproduction apparatus.
Figure 11:
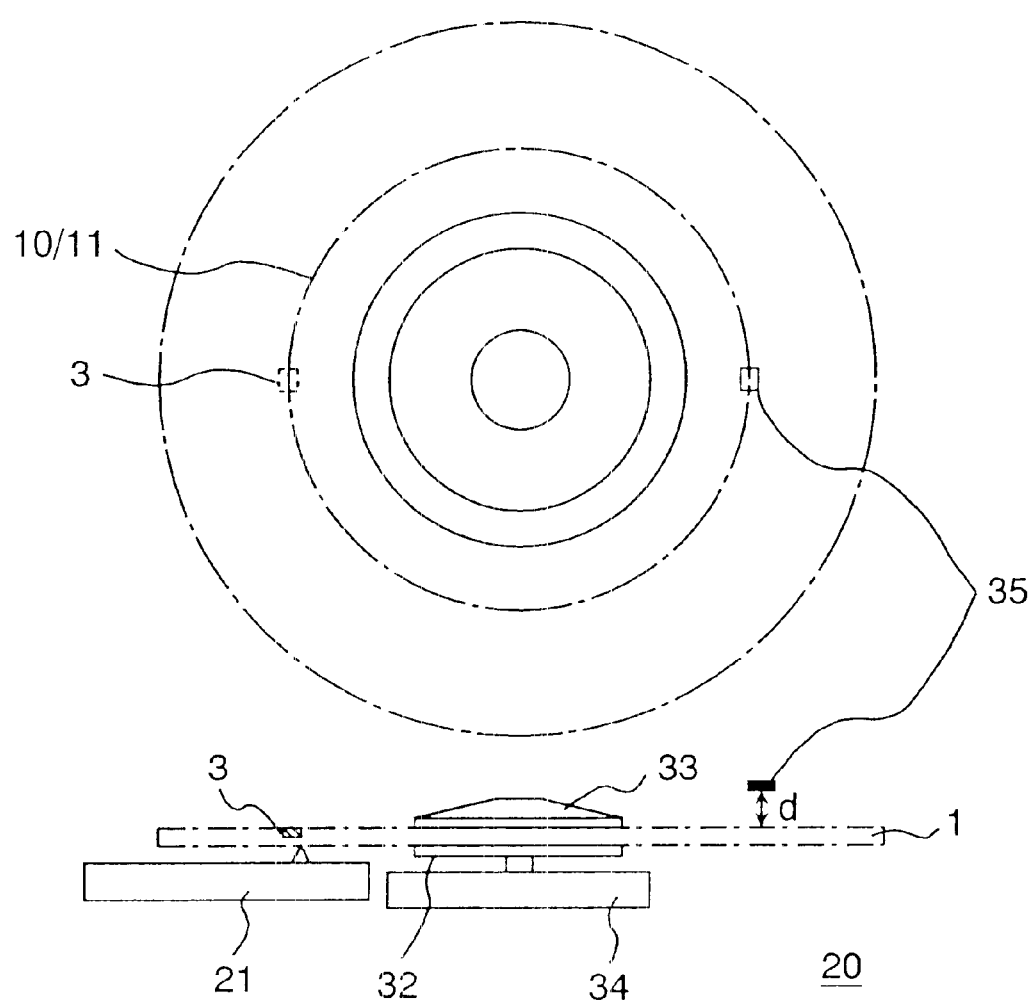
FIG. 11 is a diagram of another embodiment of this invention, showing in brief a recording/reproduction apparatus.
Figure 13:
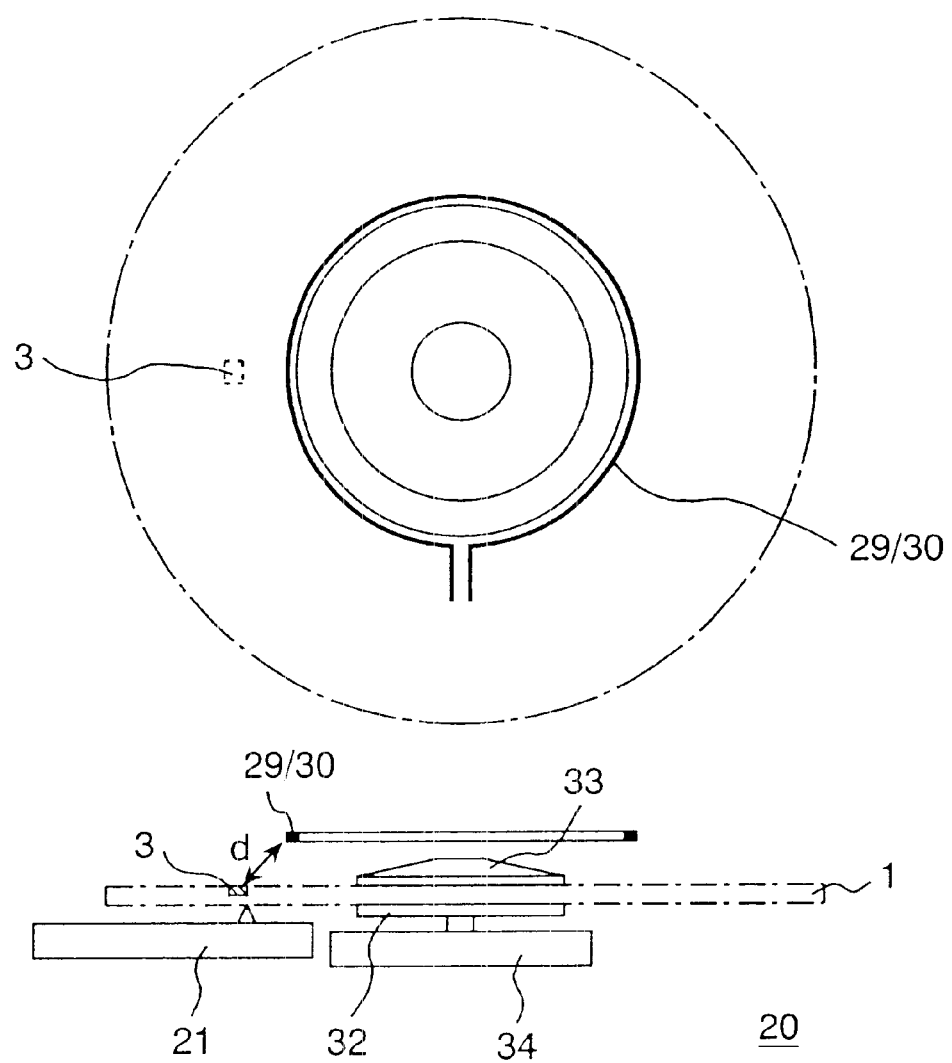
FIG. 13 is a diagram of still another embodiment of this invention, showing in brief a recording/reproduction apparatus.

(1) In case the transmitter-receiver 11 and receiver 10 as the electromagnetic coupling means attached to the disk are disposed in an arcuate, annular or spiral form, the transmitter-receiver 30 and transmitter 29 as the electromagnetic coupling means of the recording/reproduction apparatus 20 are also disposed in an arcuate, annular or spiral form on virtually concentric circles as shown in FIG. 10 and FIG. 13, or these devices are built as a transmitter-receiver module 35 disposed at a position which is away from the disk rotation center, as shown in FIG. 11. It is not obligatory for the transmitter-receiver 11, receiver 10, transmitter-receiver 30 and transmitter 29 to be located on the same circles as shown in FIG. 10 and FIG. 11, but it is enough for these devices to be at least partially located virtually on concentric circles.

Shown in FIG. 10 and FIG. 11 are the arrangements intended to make smaller the distance d of transmission between the transmitter-receiver 11 and receiver 10, and the transmitter-receiver 30 and transmitter 29 so as to improve the transmission efficiency. Actually, however, it is not always possible for the transmitter-receiver 30 and transmitter 29 of the recording/reproduction apparatus 20 to have a small transmission distanced due to the parts layout in the apparatus, and they are practically disposed to have a moderate transmission distance d on concentric circles as shown in FIG. 13.

The transmitter-receiver module has an integrated circuit arrangement inclusive of the transmitter-receiver 30 and transmitter 29 as the electromagnetic coupling means of the recording/reproduction apparatus and the associated driving circuitries. These devices 30 and 29 have arbitrary shapes and sizes.

(2) In case the transmitter-receiver 11 and receiver 10 as the electromagnetic coupling means on the disk are built in or disposed beside the IC chip, the transmitter-receiver 30 and transmitter 29 as the electromagnetic coupling means of the recording/reproduction apparatus 20 are disposed in an arcuate, annular or spiral form on virtually concentric circles.

Based on this arrangement, the transmitter-receiver 11 and receiver 10 on the disk 1 and the transmitter-receiver 30 and transmitter 29 of the recording/reproduction apparatus 20 keep a constant transmission distance d during the disk rotation, and the fluctuation of transmission is small. If these devices are located on the same circles, in which case the transmission distance d between the apparatus and disk is minimal, the transmission efficiency is high.

Figure 14:
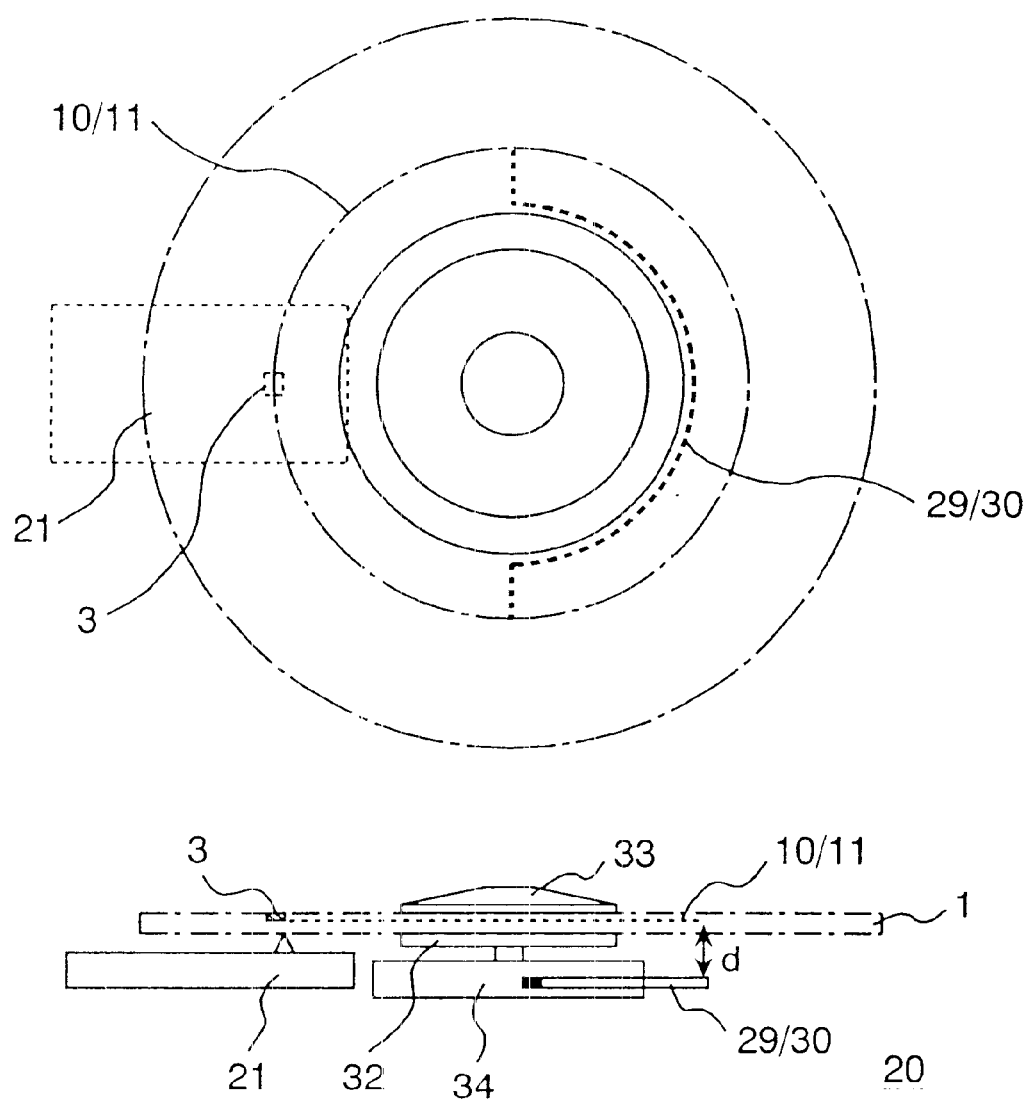
FIG. 14 is a diagram of still another embodiment of this invention, showing in brief a recording/reproduction apparatus.

Although the foregoing arrangements are the disposition of the transmitter 29 and transmitter-receiver 30 of the recording/reproduction apparatus and the transmitter-receiver module 35 all located on the side of the disk 1 opposite to the side where the disk medium record/reproduce circuit 21 is located, it is not obligatory, but these devices may be located on the same side as the record/reproduce means 21 as shown for example in FIG. 14. The disposition of these devices outside the range of motion of the disk medium record/reproduce circuit 21 as shown in the figure is effective for the reduction of thickness of the apparatus.

Although the arrangements shown in FIG. 10, FIG. 11, FIG. 13 and FIG. 14 are the cases where either the transmitter-receiver 11 and receiver 10 on the disk or the transmitter-receiver 30 and transmitter 29 of the recording/reproduction apparatus 20 are disposed in an annular form, these arrangements are not obligatory, but they may be disposed in an arcuate or spiral form.

Figure 12:
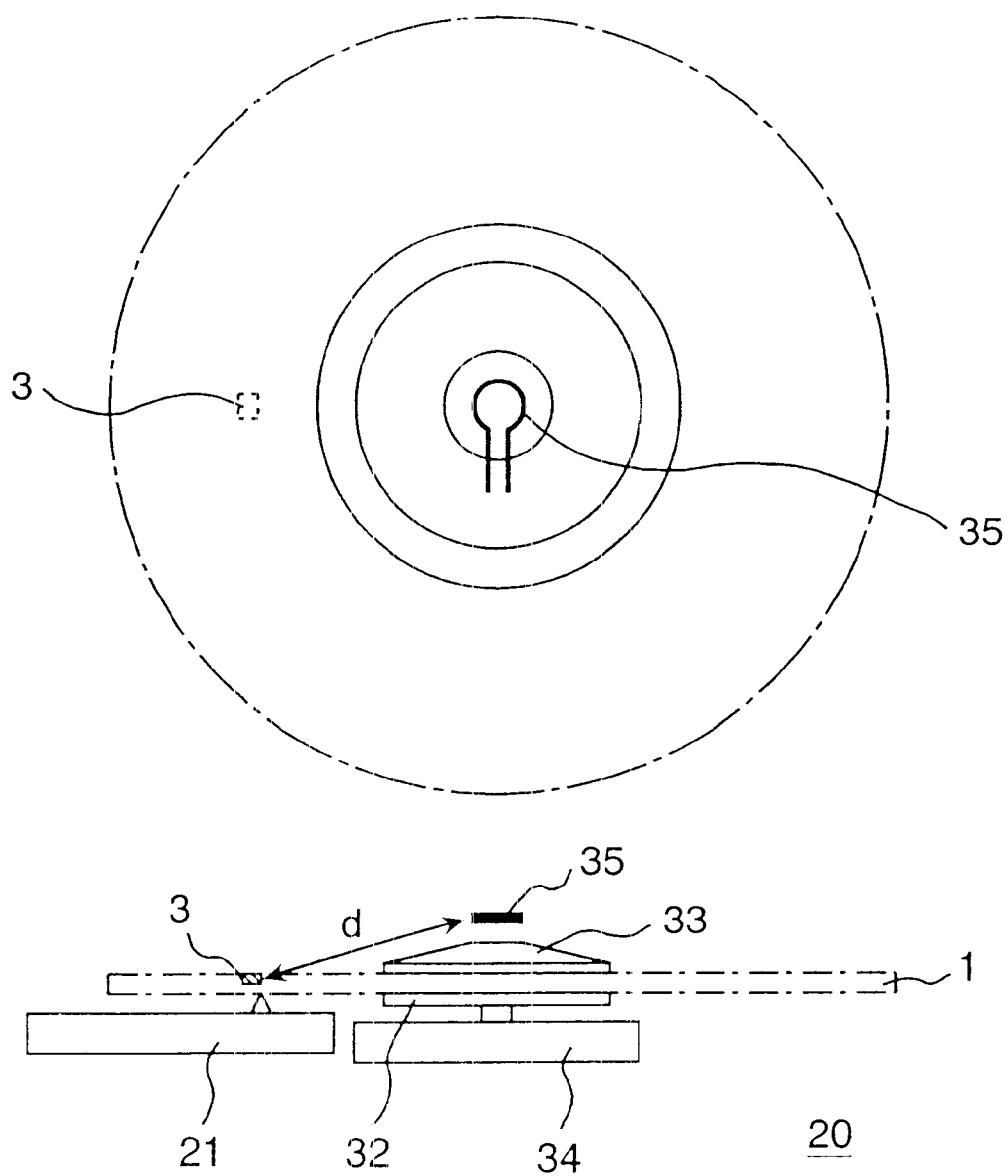
FIG. 12 is a diagram of still another embodiment of this invention, showing in brief a recording/reproduction apparatus.

As another embodiment of this invention, as shown in FIG. 12, the transmitter for supplying power to the memory is built in the form of a transmitter-receiver module 35 and disposed at a position which is virtually on the center axis of the turntable. In this case, the receiver 10 and transmitter-receiver 11 on the disk are disposed either in an annular form or spiral form, or may be built in the IC chip.

Based on this arrangement, the transmitter-receiver 11 and receiver 10 on the disk 1 and the transmitter-receiver 30 and transmitter 29 of the recording/reproduction apparatus 20 keep a constant distance during the disk rotation, and the fluctuation of transmission is small. In addition, even in case the memory on the disk has its receiver and transmitter-receiver built in the IC chip, the recording/reproduction apparatus can have a smaller transmitter-receiver and transmitter, the devices can keep a constant distance during the disk rotation, and the fluctuation of transmission is small.

Although the foregoing arrangements shown in FIG. 10, FIG. 11 and FIG. 12 are the disposition of the electromagnetic coupling means on the side of the disk opposite to the side where the disk medium record/reproduce circuit 21 is located, it is not obligatory, but these devices may be located on the same side.

Next, manners of attachment of the IC chip and electromagnetic coupling means on the disk and their positions in the disk thickness direction will be explained.

The optical disk is generally formed of two pieces of plastic sheets stuck together, and the IC chip for the memory and the electromagnetic coupling means are disposed in regard to the disk thickness direction based on the following schemes as will be explained in connection with FIGS. 6A–6D, FIGS. 8A–8D and FIGS. 9A–9D.

(1) The IC chip for the memory 3 and the receiver 10 and transmitter-receiver 11 as the electromagnetic coupling means are formed based on the insert-lamination in the plastic sheet 19 that is different from the plastic sheet 19 for the formation of the recording medium 2, as shown in FIG. 6A and FIGS. 8A and 8B. The memory 3 is attached to the plastic sheet 191 that is not used for the formation of the recording medium 2 and the performance is tested for this part alone in advance, whereby the yield of optical disks is enhanced.

The plastic sheet, with the memory being insert-laminated, will have an offset by the thickness of the IC chip and electromagnetic coupling means, and therefore it is unstable for the formation of a recording medium on it. Accordingly, this fabrication scheme is suitable for optical disks having a relatively inexpensive recording medium formed on only one plastic sheet.

Figure 9A:
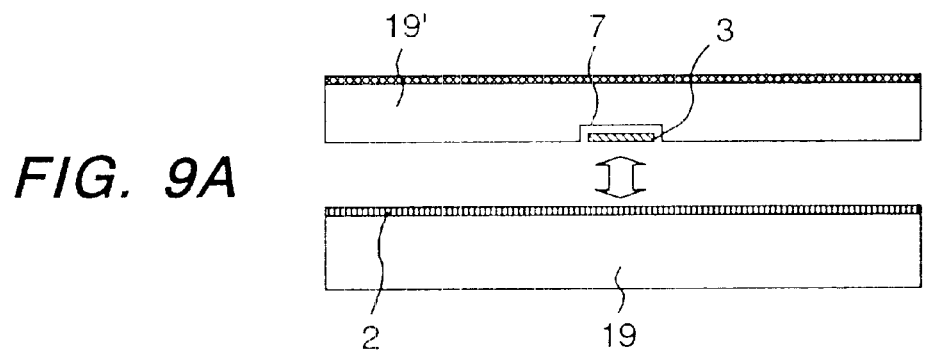
FIGS. 9A–9D are diagrams of still another embodiment of this invention, showing the structure of an optical disk.
Figure 9B:
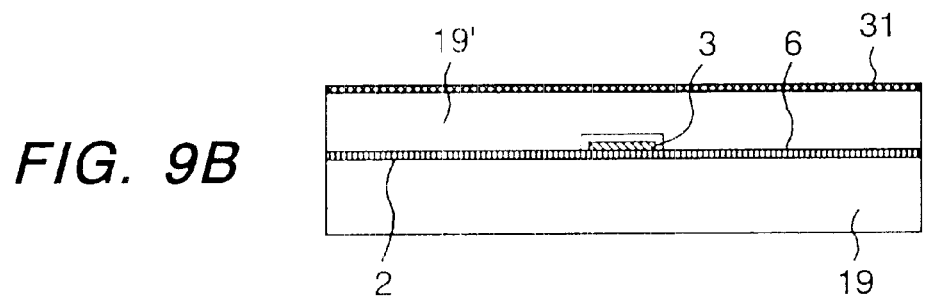
Figure 9C:
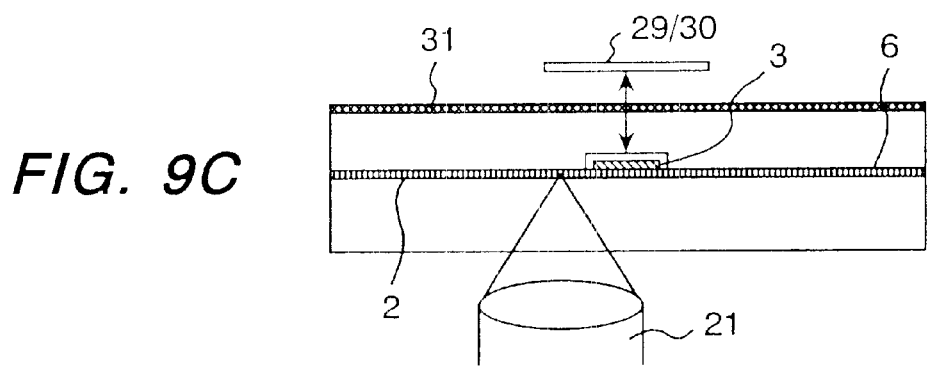
Figure 9D:
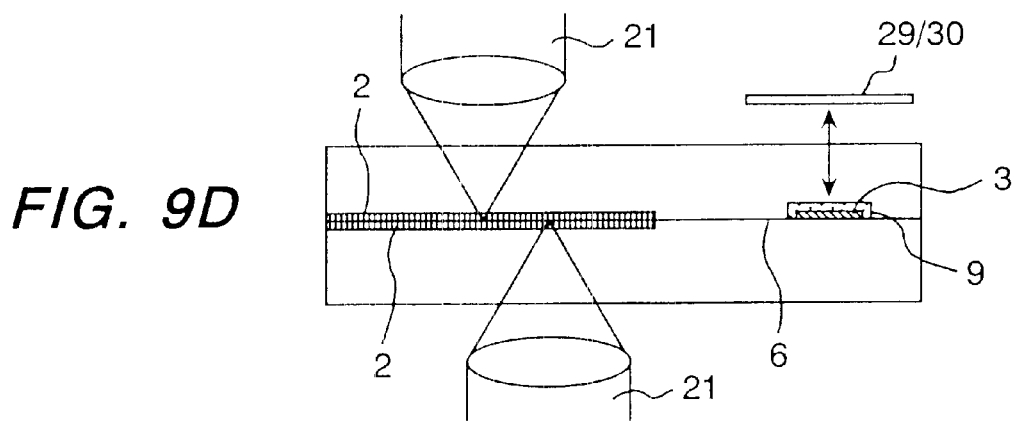

(2) A recessed section 7 is formed in one plastic sheet on its sticking side, the IC chip for the memory 3 and the receiver 10 and transmitter-receiver 11 as the electromagnetic coupling means are put in the recessed section 7, and both sheets are stuck together, as shown in FIG. 6B and FIGS. 9A and 9B. The IC chip and electromagnetic coupling means are concealed within the thickness of the stuck plastic sheets, and the disk surface does not swell. In consequence, optical disks with the memory 3 being attached thereto can be manufactured at a high reliability and high yield. In addition, another recording medium can be formed on the plastic sheet having the IC chip in the recessed section. Accordingly, this fabrication scheme is suitable for optical disks having the attachment of memory and recording mediums formed on both plastic sheets as shown in FIG. 9D.

(3) The IC chip for the memory 3 and the receiver 10 and transmitter 11 as the electromagnetic coupling means are put in a recessed section 8 which is formed on the side of plastic sheet opposite to the sticking side, and these members are glued with resin, as shown in FIG. 6C. This scheme enables the attachment of IC chips after optical disks have been completed, allowing the disk manufacturer to produce optical disks in the conventional manner and the distributer to put IC chips on afterward thereby to finish optical disks with the management function. Accordingly, it is suitable for the case of organizing a small-scale disk management system.

(4) The IC chip for the memory 3 can possibly fail in operation when it is exposed to a strong light, and therefore it is covered with light-blocking resin against the laser beam or the like used by the optical head. Alternatively, a light-blocking sheet 31 is stuck to the plastic sheet as shown in FIGS. 8B and 8C and FIGS. 9B and 9C.

The controller 13 built in the IC chip for the memory 3 is designed, for example, to focus the optical head which is the disk medium record/reproduce circuit 21 of the recording/reproduction apparatus 20 to a certain position so that it operates on the tracking control actuator to alter the electrical offset value of the focus system, for example, independently of the recording/reproduction apparatus 20.

In consequence, it becomes possible in the future, when multi-layer recording disks having various recording capacities will be put on the market, for the memory 3 on the disk to deal with the number of recording layers and recording positions across the layers thereby to control independently the focal position of the optical head across the layers for the reproduction of records, for example. Accordingly, when optical disks having several recording layers for various recording capacities become available, it is possible for the recording/reproduction apparatus to be compatible with these disk products for the reproduction of records.

The inventive optical disk and recording/reproduction apparatus includes on the optical disk a memory, which is built in the form of a semiconductor IC chip for example, used for the management of the main information of a computer application program, game program, or audio/video record, in addition to the recording medium for the main information.

For supplying power to the semiconductor IC chip, an electromagnetic coupling means, i.e., a receiver means, such as an antenna is built in or disposed beside the IC chip. Alternatively, it is disposed in an annular or one or multi-turn spiral form on the optical disk. Similarly, for the communication of control information between the optical disk and the recording/reproduction apparatus, another electromagnetic coupling means, i.e., a transmitter-receiver means, such as an antenna is built in or disposed beside the IC chip on the disk. Alternatively, a data communication circuit is disposed in an arcuate, annular or one or multi-turn spiral form on the disk.

In correspondence to these devices on the disk, a transmitter means and transmitter-receiver means which are disposed in an arcuate, annular or spiral form, or built in the form of a module is provided for the recording/reproduction apparatus.

The signals of control information transacted with the memory have their transmission band set outside of the main information reproduction band, and the IC chip is disposed in the inner section or outer section of the recording medium forming area on the disk depending on the transmission band of control information. For optical disks formed of plastic sheets stuck together, the memory is disposed at an appropriate position depending on the purpose of the disks.

In consequence, it becomes possible to manufacture at a high reliability and high yield reproduction-only optical disks which are capable of writing afterward and reading out control information simply and reliably in the attached memory, and to provide optical disks and recording/reproduction apparatus which uses the disks for application systems at a low cost.

What is claimed is:

1. A recording disk having a recording medium and a memory assembly which is disposed in an annular or spiral form at a certain position on said disk, said memory assembly comprising a memory which stores information, a signal processor which writes or reads out information to/from said memory, a transmitter-receiver which transacts information with an exterior of said disk, a controller which controls said memory, signal processor and transmitter-receiver, a receiver which receives power in the form of a signal supplied from the exterior of said disk for the operation of said memory, signal processor, transmitter-receiver and controller, and a rectifier which converts the signal received by said receiver into power;

wherein said memory, signal processor, controller, rectifier, and transmitter-receiver and/or receiver are at least partially formed of a semiconductor integrated circuit; and wherein at least portions of said memory, signal processor and controller are covered with light-blocking resin.

2. A recording disk having a recording medium and a memory assembly which is disposed in an annular or spiral form at a certain position on said disk, said memory assembly comprising a memory which stores information, a signal processor which writes or reads out information to/from said memory, a transmitter-receiver which transacts information with an exterior of said disk, a controller which controls said memory, signal processor and transmitter-receiver, a receiver which receives power in the form of a signal supplied from the exterior of said disk for the operation of said memory, signal processor, transmitter-receiver and controller, and a rectifier which converts the signal received by said receiver into power;

wherein said memory, signal processor, controller and rectifier are at least partially formed of a semiconductor integrated circuit, and said transmitter-receiver and/or receiver are formed separately from said integrated circuit; and wherein at least portions of said memory, signal processor and controller are covered with light-blocking resin.

3. A recording disk having a recording medium and a memory assembly which is disposed in an annular or spiral form at a certain position on said disk, said memory assembly comprising a memory which stores information, a signal processor which writes or reads out information to/from said memory, a transmitter-receiver which transacts information with an exterior of said disk, a controller which controls said memory, signal processor and transmitter-receiver, a receiver which receives power in the form of a signal supplied from the exterior of said disk for the operation of said memory, signal processor, transmitter-receiver and controller, and a rectifier which converts the signal received by said receiver into power;

wherein said memory, signal processor, controller, rectifier, and transmitter-receiver and/or receiver are at least partially formed of a semiconductor integrated circuit; and wherein a light-blocking sheet is provided for covering at least portions of said memory, signal processor and controller against the light.

4. A recording disk having a recording medium and a memory assembly which is disposed in an annular or spiral form at a certain position on said disk, said memory assembly comprising a memory which stores information, a signal processor which writes or reads out information to/from said memory, a transmitter-receiver which transacts information with an exterior of said disk, a controller which controls said memory, signal processor and transmitter-receiver, a receiver which receives power in the form of a signal supplied from the exterior of said disk for the operation of said memory, signal processor, transmitter-receiver and controller, and a rectifier which converts the signal received by said receiver into power;

wherein said memory, signal processor, controller and rectifier are at least partially formed of a semiconductor integrated circuit, and said transmitter-receiver and/or receiver are formed separately from said integrated circuit; and wherein a light-blocking sheet is provided for covering at least portions of said memory, signal processor and controller against the light.

5. A recording disk having a recording medium and a memory assembly which is disposed in an annular or spiral form at a certain position on said disk, said memory assembly comprising a memory which stores information, a signal processor which writes or reads out information to/from said memory, a transmitter-receiver which transacts information with an exterior of said disk, a controller which controls said memory, signal processor and transmitter-receiver, a receiver which receives power in the form of a signal supplied from the exterior of said disk for the operation of said memory, signal processor, transmitter-receiver and controller, and a rectifier which converts the signal received by said receiver into power;

wherein said memory, signal processor, controller, rectifier, and transmitter-receiver and/or receiver are at least partially formed of a semiconductor integrated circuit; and wherein a counterweight is disposed at a symmetrical position against the position of said memory assembly with respect to a center of rotation of said disk for enabling balancing of said disk with the additional weight of said memory assembly.

6. A recording disk having a recording medium and a memory assembly which is disposed in an annular or spiral form at a certain position on said disk, said memory assembly comprising a memory which stores information, a signal processor which writes or reads out information to/from said memory, a transmitter-receiver which transacts information with an exterior of said disk, a controller which controls said memory, signal processor and transmitter-receiver, a receiver which receives power in the form of a signal supplied from the exterior of said disk for the operation of said memory, signal processor, transmitter-receiver and controller, and a rectifier which converts the signal received by said receiver into power;

wherein said memory, signal processor, controller and rectifier are at least partially formed of a semiconductor integrated circuit, and said transmitter-receiver and/or receiver are formed separately from said integrated circuit; and wherein a counterweight is disposed at a symmetrical position against the position of said memory assembly with respect to a center of rotation of said disk for enabling balancing of said disk with the additional weight of said memory assembly.

* * * * *